United States Patent
Bigret

(10) Patent No.: US 6,649,199 B2
(45) Date of Patent: Nov. 18, 2003

(54) PROCESS FOR MANUFACTURING A FERMENTED FOOD PRODUCT USING CELL EXTRACTS

(75) Inventor: Marc Bigret, Montpellier (FR)

(73) Assignee: Biosaveurs (FR)

( * ) Notice: Subject to any disclaimer, the term of this patent is extended or adjusted under 35 U.S.C. 154(b) by 0 days.

(21) Appl. No.: 09/402,123

(22) PCT Filed: Mar. 31, 1998

(86) PCT No.: PCT/FR98/00649

§ 371 (c)(1),
(2), (4) Date: Sep. 30, 1999

(87) PCT Pub. No.: WO98/43488

PCT Pub. Date: Oct. 8, 1998

(65) Prior Publication Data

US 2003/0138523 A1 Jul. 24, 2003

(30) Foreign Application Priority Data

Apr. 1, 1997 (FR) .............................. 97 03955

(51) Int. Cl.⁷ .......................... A23B 4/22; A23C 19/032; A23C 9/127
(52) U.S. Cl. ............................ 426/34; 426/36; 426/38; 426/56; 426/582; 426/574
(58) Field of Search .......................... 426/582, 26, 583, 426/61, 62, 63, 34, 38, 56, 574

(56) References Cited

U.S. PATENT DOCUMENTS

| 3,295,991 A | | 1/1967 | Cort et al. ..................... 99/116 |
| 3,975,544 A | | 8/1976 | Kosikowski ................. 426/35 |
| 4,147,807 A | * | 4/1979 | Gryczka et al. .............. 426/56 |
| 4,158,607 A | * | 6/1979 | Kalinowski et al. .......... 195/62 |
| 4,568,548 A | * | 2/1986 | Sprenger ....................... 426/8 |

FOREIGN PATENT DOCUMENTS

| EP | 0 058 856 A | | 9/1982 |
| EP | 0 159 303 A | | 10/1985 |
| EP | 0 159 303 | * | 10/1985 |
| EP | 0 337 497 A | | 10/1989 |
| FR | 2 368 224 A | | 5/1978 |

OTHER PUBLICATIONS

Scott., R. Cheesemaking Practice., 2nd., Elsevier., p. 235–241 1986.*
Database FSTA International Food Information Service (IFIS), Franfurt/Main, DE, 87–1–02–p0154, Braun S.: "Microencapsulated multi–enzyme systems to produce flavors and recycle cofactors", see abstract & Dissertation Abstracts International B366, vol. 46, No. 2, 1985.
Chen C et al: "Beschleunigung Der Reifung Von Fettarmem Cheddarkaese Unter Verwendung Lyophilisierter Extrakte Verschiedener Mikroben Aus Kaese" Milchwissenschaft, vol. 47, No. 31, Jan. 1, 1992, p. 199.

* cited by examiner

*Primary Examiner*—Keith Hendricks
(74) *Attorney, Agent, or Firm*—Welsh & Katz, Ltd.; Thomas W. Tolpin

(57) ABSTRACT

The invention relates to a process for manufacturing a fermented food product, which enables the maturation phase of said product to be shortened and its organoleptic to be improved. The process is characterized by the addition to the raw material of a cluster of cell extracts of its fermenting micro-organisms, which are either naturally present or added in live state. The proportion of each extract in the cluster is approximately equivalent to that of the corresponding micro-organism in the fermenting mixture.

16 Claims, No Drawings

PROCESS FOR MANUFACTURING A FERMENTED FOOD PRODUCT USING CELL EXTRACTS

This application is a 371 National Stage of PCT/FR98/00649, filed Mar. 31, 1998.

FIELD OF THE INVENTION

The invention concerns a process for manufacturing fermented food products. More particularly, it relates to the use of the cell contents of micro-organisms in order to reduce the duration of the ripening phase and to improve the organoleptic properties of these products.

PRIOR ART OF THE INVENTION

The processes for manufacturing fermented products may be divided into two major steps:
  preparation of the product for fermentation,
  ripening or maturation of this product, during which the constituents of the raw material are converted by the action of physical or biological factors, such as enzymes, certain of which are of microbial origin.

This second phase is often quite long. For obvious economic reasons, the use of different means has already been envisaged in order to shorten its duration. In the field of milk products, they consist of:
  physical means: patent WO-A-8705470 describes the use of a magnetic field to accelerate the ripening of cheeses. Another patent recommends increasing the pressure;
  microbiological means: certain patents describe the addition of particular micro-organisms in order to shorten the ripening period. Thus, patent EP 0 365 173 mentions the use of a novel micro-organism, while patents SU-A-1 353401 and NL-A-8700176 each refer to the addition of a particular lactobacillus with a normal lactococcus flora. Patent EP 0 304 119 describes the use of a concentrate obtained from fermentation products of components of cheese by the action of micro-organisms having a proteolytic, lipolytic or peptidolytic activity;
  enzymatic means: certain patents describe the addition of an enzyme such as a protease, (EP 0 246 163), a fruit protease (JP-A-062661682), and a lipase extracted from a strain of Aspergillus (EP 0 167 309);
  combination of means: certain processes envisage the addition to the raw material of an enzyme and a micro-organism in order to accelerate ripening. Patent CA 2 072 159 describes the use of a neutrase and a heated lactobacillus while patent EP 469 857 mentions the addition of a lactobacillus and a lipase or a protease.

The process described in patent EP 0 337 497 concerns the manufacture of fermented products and enables the maturation of these products to be accelerated by adding extracts of cells of one or more usual micro-organisms to the mass of raw material.

However, no proportions or indications are given as to the number of different types of micro-organisms making up the solution added to the raw material. Moreover, the examples, and more particularly example 2, emphasise that this process encourages the development of one or more flavours but does not deal with the ripening process in its entirety.

The description of the process made in this patent application thus does not indicate any technical means capable of resolving a problem in a reproducible manner.

The invention described in patent EP 0 058 856 concerns a process for the preparation of flavoured food products enabling the maturation time for the products to be reduced.

According to this invention, the flavouring and acceleration of the maturation process are brought about by the addition of an already fermented mass to the raw material and not by the direct addition of ripening factors. This mass is obtained by adding isolated enzyme complexes, derived from pure or mixed cultures of the usual micro-organisms, to a fraction of the material to be flavoured. The acceleration of ripening thus relies on the special treatment applied to this fraction.

Patent FR 2 368 224 claims the use of a purified protease extracted from a mould and an autolysate of the cells of a lactic bacterium as the proteolytic enzyme source.

Finally, patents U.S. Pat. No. 3,295,991 and EP 0 159 303 describe the addition to milk, after treatment, of an extract of micro-organisms normally used in the manufacture of cheese.

these extracts include one or more enzymes. Reading these two texts shows that:

these inventions relate to the addition of extracts having only a proteolytic action, the extract mentioned is always produced from a very limited number of different micro-organism strains, which belong to the group of lactic bacteria.

It thus follows from a study of the prior art that:

many solutions have been envisaged for accelerating the ripening of fermented products;

these use different means;

if the means are microbiological, the micro-organism, or exceptionally micro-organisms, used are almost exclusively lactic bacteria;

if the means are enzymatic, it relates to a single enzyme family which is almost always that of proteases. Moreover, when the enzyme is derived from a micro-organism, this extract is partially or totally purified.

In the field of cured meat products, the processes used remain traditional and the acceleration of ripening has consequently not been studied.

Up to now, the solutions proposed to shorten the ripening phase of a fermented product using micro-organisms or their enzymes therefore aims almost solely at encouraging the biochemical processes brought about by lactic bacteria.

In addition, although the solutions of the prior art exhibit a certain efficiency as regards the shortening of the ripening phase, they still too often provide a final product having unsatisfactorily organoleptic properties. Indeed, whatever the acceleration process used, the product obtained generally exhibits an attenuation of flavours and unctuousness of the paste due to the attenuation of proteolysis or lipolysis. In order to compensate for this phenomenon, the tendency has been to modify the technology by increasing the fat content and to remove lactose during draining. The quality of the final product is however often very variable.

It should finally be noted that the manufacturing conditions (pH, temperature, duration of certain phases, addition of compounds etc.) for a given fermented food product are very strict. The biochemical reactions occurring during maturation are numerous, complex and sequential. Their combination is poorly understood and the intervention of a new factor, even an apparently simple one, in a ripening process always has consequences which are difficult to estimate.

OBJECT OF THE INVENTION

The object of the present invention compared with the prior art is to shorten still further the ripening phase of fermented food products and to improve their organoleptic properties.

DESCRIPTION OF THE INVENTION

The present invention concerns a method for preparing and using the cell contents of a complete collection of micro-organisms for ripening fermented food products.

It more particularly concerns an improved process for manufacturing fermented food products such as cheeses or cured meat products by adding the cell contents of this collection to the components of the starting material.

In the normal process for manufacturing fermented products, the raw material is subjected to various treatments before the product is stored for ripening.

For a milk product, after standardization and if necessary heat treatment of the milk, the following stages are carried out, among others:

coagulation or precipitation of the curds; this is obtained by the addition of enzymes (rennet) or by acidification of the raw material; it may also be combined (rennet and acidifying compounds). To this stage of the process, according to the desired final product and the particular operating conditions, technological flora may be added (lactic ferment and/or ripening microbial flora, known as secondary flora).

draining: this separates the whey from the curds so as to bring the latter to a particular water content and so as to adjust mineralization. At the start of this phase, cutting and washing, stirring or furthermore pressing, washing and moulding may be carried out according to the final product desired.

salting: this acts on the bound water by changing the water bonds to the substrate. Accordingly, it completes draining, acts on the development of micro-organisms and consequently influences ripening and contributes to the flavour of the cheese, ripening: this corresponds to the enzymatic digestion of the curds obtained by biochemical transformations, giving the cheese new properties; enzymes are ripening agents and have various origins (milk, rennet or rennet substitute, and micro-organisms from milk, from yeasts, from the atmosphere etc.).

It should be noted that the normal processes for manufacturing milk products do not systematically include the addition of a technological flora. Indeed, certain operating methods are such that the micro-organisms naturally present in milk or the contaminants coming from the environment in which this milk is collected and treated etc. are sufficient to ensure the desired conversion of these compounds of the raw material. The absence of seeding with any lactic or ripening flora thus does not signify that the cheese is manufactured without the intervention of this flora but that the latter is naturally present in the raw material.

For a cured meat products, the following are principally carried out:

cutting the meat, adding additives and technological flora, filling, incubation, storage for ripening.

These known processes have in common the use (natural presence or seeding) of a ripening flora consisting of a mixture of different micro-organisms (bacteria, yeasts and/or moulds) of which the nature and proportion are a function of the final product desired. This flora serves to transform the components of the raw material and to give the final product its characteristics of flavour and texture, etc. The quantity of cells thus added is generally between approximately $10^2$ and $10^5$ per milliliter of milk or gramme of meat according to the nature of the species. This quantity is less than that of living organisms taking part in the ripening mechanism. Indeed, the concentration of bacteria, yeasts and moulds varies with time by reason of their multiplication. The importance of this development varies according to the micro-organism considered, the conditions under which the treated raw material is kept, etc.

The invention consists of adding to the components of this raw material a collection of cell extracts taken from the collection of micro-organisms of which the composition and properties are based on those of the ripening flora, either natural or provided by seeding, for a given product.

The mixture of extracts of these multiple micro-organisms mainly contain proteases, peptidases, lipases and esterases, enzymes serving to catalyze the reactions which are poorly understood but which are however necessary for the maturation of these products, i.e. for conferring their characteristics of flavour, appearance and texture etc.

A cell equivalent is defined as all the constituents of this cell (cell contents and membrane fragments) after its lysis. According to the present invention, the number of cell equivalents forming the added collection is greater, by approximately 10 to 1000 times, than the number of cells constituting the ripening bacterial flora normally seeding the raw material. The collection of cell extracts thus ensures the provisions of $5.10^4$ to $10^8$ cell equivalents per milliliter of milk or gramme of meat.

The method for preparing the collection of extracts of micro-organisms comprises the steps of:

preparing the biomass;

optional concentration of this;

cell lysis;

blending the extracts obtained.

The living material is prepared by traditional fermentation carried out in such a way as to obtain a final biomass of approximately $10^9$ ufc/ml for bacteria and $10^7$ for yeasts and moulds. The micro-organisms used in this process are as follows:

GRAM+ Bacteria:
  Corynebacteriaceae family:
    genus Corynebacterium, of the species *C. glutamicum*
    genus Brevibacterium, of the species *B. linens*
    genus Arthrobacter, of the species *A. globiformis*
    genus Propionibacterium
  Micrococaceae family:
    genus Micrococcus
    genus Staphylococcus, of the species *S. xylosus* and *S. carnosus*

GRAM− Bacteria:
  Enterobacteriaceae family
    genus Hafnia, of the species *H. alvei*
    genus Enterococcus, of the species *E. faecalis* or *E. faecium*

Yeasts:
  genus Debaryomyces, of the species *D. hansenii*
  genus Saccharomyces of the species *S. cerevisiae*
  genus Kluyveromyces, of the species *K. lactis*
  genus Geotrichum, of the species *G. candidum*

Moulds:
  Filamentous fungi family:
    genus Penicillium, of the species *P. candidum, P. chrysogenum, P. roquefortii* and *P. nalgiovensis*

The development of each strain used is carried out in separately. However certain related micro-organisms may be cultivated in the same fermenter.

Concentration of the biomass is an optional step. It is carried out by centrifuging, tangential filtration or any other method known in the art.

Cellular lysis is carried out by known means such as irradiation, heat treatment, freeze drying, ultra high pressures, osmotic shock, ultrasound, pH variations, grinding, enzyme treatment etc. It enables enzymes to be collected from bacteria, yeasts or moulds. It is chosen in such a way as to limit to a maximum the denaturing of these biological catalysts.

The blend of extracts of different origins, namely coming from each micro-organism cultivated, is prepared according to known processes. At this stage of the treatment, it is in the form of a suspension.

According to an alternative embodiment, this mixture is dried, frozen or treated by any process known in the art, giving it a solid form suitable for keeping.

The peculiarity of this collection is thus that it includes a relatively large number of enzymes. Each of these possesses a particular function (conversion of proteins, hydrolysis of peptides, modification of lipids and liberation of a large number of compounds, certain of which have an important part to play on the texture and flavour of the products). Their action, and that of the enzymes of ripening micro-organisms naturally present or incorporated, is accumulative.

This collection of the extracts of micro-organisms thus constitutes a complex factor for modifying the ripening process. It has been found however that it ensures that all the catalytic reactions are carried out which are necessary for good maturation while respecting the fermentation mechanisms which enable a final product to be obtained with a quality superior to that of a product obtained by a conventional process. Analyses making it possible to arrive at an assessment which is both objective, by instrumental methods (measurement of the concentration of organic acids), as well as subjective, by proving differences established by a jury of experts, show that this addition of a collection of extracts of micro-organisms also makes it possible to improve the organoleptic properties of the final product. With an equal ripening time, the products manufactured according to the process of the present invention compared with those obtained by the normal process, have an unchanged organic acid content and are judged to be better (score similar to a more intense flavour).

For a given product, the addition to its raw material of a mixture consisting of extracts of all or part of the micro-organisms taking part in its natural maturation therefore has the effect of accelerating its ripening and of improving its organoleptic properties.

The preferred method of use consists of adding the collection of extracts thus obtained to milk before coagulation during the introduction of rennet or acidifying compounds or to the meat blend before filling. The quantity of extract added depends on its method of preparation. For cultures producing the concentrations previously stated ($10^9$ for bacteria, $10^7$ for years and moulds), it is approximately $1/10000$ of the volume (for milk) or of the mass (for meat) of the raw material if the biomass has been subjected to concentration steps and has been put into a salt solution. It is 1 % in the contrary case.

According to a variant, the collection of extracts of micro-organisms is incorporated in the raw material during its pretreatment i.e. 12 to 24 hours before the start of the manufacture.

According to another variant, this addition is made during a subsequent phase of the manufacturing process before maturation starts.

Table 1 gives a summary by family of the fermented food product, the preferred collection of micro-organisms and the number of cells, the extract of which is incorporated in 1 milliliter of milk or 1 gramme of meat.

TABLE 1

| CHEESE | | | | |
|---|---|---|---|---|
| Cheeses Micro-organisms | Equivalent to the number of cells/ml of milk | | | |
| | A | B | C | D |
| BACTERIA | | | | |
| Corynebacterium | $10^6$ to $5.10^7$ | $10^6$ to $5.10^7$ | $10^6$ to $5.10^7$ | $10^6$ to $5.10^7$ |
| B. linens | $10^6$ to $5.10^7$ | $10^6$ to $5.10^7$ | $10^6$ to $5.10^7$ | $10^6$ to $5.10^7$ |
| Arthrobacter | $10^6$ to $5.10^7$ | $10^6$ to $5.10^7$ | $10^6$ to $5.10^7$ | $10^6$ to $5.10^7$ |
| Propionibacterium | 0 | 0 | 0 | $10^6$ to $5.10^7$ |
| Micrococcus | $10^6$ to $5.10^7$ | $10^6$ to $5.10^7$ | $10^6$ to $5.10^7$ | $10^6$ to $5.10^7$ |
| YEASTS | | | | |
| Debaryomyces | $10^5$ to $5.10^6$ | $10^5$ to $5.10^6$ | $10^5$ to $5.10^6$ | $10^5$ to $5.10^6$ |
| Kluyveromyces | $10^5$ to $5.10^6$ | $10^5$ to $5.10^6$ | $10^5$ to $5.10^6$ | $10^5$ to $5.10^6$ |
| Geotrichum | $10^5$ to $5.10^6$ | 0 | 0 | 0 |
| MOULDS | | | | |
| P. candidum | $5.10^4$ to $5.10^5$ | 0 | 0 | 0 |
| P. roquefortii | 0 | 0 | $5.10^4$ to $5.10^5$ | 0 |

| CURED MEAT PRODUCTS | |
|---|---|
| Micro-organisms | Equivalent to the number of cells/g of meat |
| BACTERIA | |
| Staphylococcus | $10^6$ to $5.10^7$ |
| Micrococcus | $10^6$ to $5.10^7$ |
| YEASTS | |
| Debaryomyces | $10^5$ to $5.10^6$ |
| Kluyveromyces | $10^5$ to $5.10^6$ |
| MOULDS | |
| P. chrysogenum | $5.10^4$ to $5.10^5$ |
| P. nalgiovensis | $5.10^4$ to $5.10^5$ |

A. A soft or unpressed uncooked cheese with a flowered rind
B. A soft or unpressed uncooked cheese with a washed rind
C. A veined cheese
D. A cooked pressed cheese.

According to one variant, the addition of this collection of cell extracts may be accompanied by one or more ripening factors consisting of enzymes, lactic bacteria, an extract from their cells and a collection of extracts from their cells or furthermore any other compatible treatment aimed at improving the process for manufacturing the fermented product.

According to another embodiment, the collection of extracts from micro-organisms is added in an excess compared with the proportions mentioned previously, to only a fraction of the raw material. The volume of this fraction is between 5 and 50 % of the volume or the mass of the raw material. After acceleration maturation due to the extent of the concentration of cell extracts, this fraction is itself added to the rest of the raw material. These two parts are mixed at any moment as long as they have consistencies which will ensure the uniformity of the said material. The addition of this fraction ripened in an accelerated manner mainly provides an addition of flavour.

EXAMPLES OF EMBODIMENTS

I—A cheese of the Edam Type was Prepared According to the Present Invention

I.1 Choice of Micro-organisms

The micro-organisms of which an extract was used in this embodiment were:

Geotrichum

B. linens

A. globiformis

I.2 Culture of Micro-organisms

Geotrichum was cultured in a medium composed of monopotassium phosphate, magnesium sulfate, dextrose, yeast extract, lactic acid and deionized water.

The initial pH of this solution was between 4 and 4.5.

Incubation was carried out at 25° C. It was aerobic and lasted 36 to 48 hours.

The final concentration of Geotrichum in the broth was approximately $10^7$/ml.

B. linens and A. globiformis were cultured in distinct media composed of magnesium sulfate, sodium chloride, ascorbic acid, yeast extract, casein peptone, Tween 80, lactose, skimmed milk and deionized water.

The initial pH of these broths was adjusted to 7 with acid.

Incubation was carried out at 25° C. It was aerobic and lasted 15 to 24 hours.

The final concentration of B. linens or A. globiformis in the broths was approximately $10^9$/ml.

I.3 Concentration of the Biomass

This was carried out by centrifuging according to a known process.

I.4 Cell Lysis

This was carried out by osmotic shock by placing a gramme of each culture in 10 ml of a 20% sodium chloride (NaCl) solution. Before the start of lysis, a cell count showed that the concentration of micro-organisms in their respective solutions was approximately:

Geotrichum $10^8$/ml

B. linens $10^{10}$/ml

A. globiformis $10^{10}$/ml

I.5 Addition of the Cell Extract from the Collection of Micro-organisms

Milk, standardized in fats, was placed in a 500 liter vessel. It was heat treated: heated to 72° C. for 20 seconds.

The usual food processing agents were then added to the milk treated in this way:

lactic ferments, coagulant, calcium chloride, as well as the collection of cell extracts according to the present invention.

The ripening micro-organisms were naturally present in the raw material which was therefore not subjected to seeding.

The collection of cell extracts was prepared by blending:

5 volumes of Geotrichum extract solution (11%)

15 volumes of B. linens extract solution (33%)

25 volumes of B. globiformis extract solution (56%).

Table 2 gives the quantitative details of this operation.

TABLE 2

| Micro-organisms | Number of cell equivalents added/ml of milk | Quantity of solution introduced into 500 l of milk |
|---|---|---|
| Geotrichum | $10^4$ | 5 ml |
| B. linens | $3.10^6$ | 150 ml |
| A. globiformis | $5.10^6$ | 250 ml |
| Mixture | $8.10^6$ | 450 ml |

450 ml of the mixture of extracts from the three micro-organisms were added to 500 liters of milk in the vessel.

All the additives and the milk were blended so as to obtain a homogeneous product which was then treated by the usual process.

I.6 Ripening of the Product

This type of cheese is normally ripened for a period extending from 7 weeks to 16 months, according to the quality of the desired product, before satisfactory organoleptic properties are obtained.

In the cheese making tests carried out, the cheeses were ripened at 15° C. for a period extending from 3 to 7 weeks.

Measurements were taken during these tests on the degree of proteolysis (table 3) and tasting tests were also carried out in order to evaluate the texture and taste of the products.

The results of these tests showed that:

the process remained verifiable and controlled, contrary to the case with experiments consisting of adding pure enzymes;

the organic acid content was not altered at the end of 7 weeks, this result demonstrating the normal progress of the ripening process;

the results of the best tests at 3 and 5 weeks corresponded to those of the controls at 5 and 7 weeks respectively;

analysis of all the results made it possible to estimate a gain in time of approximately 30% of the ripening time.

TABLE 3

| | Proteolysis (mmol/kg) | | |
|---|---|---|---|
| Micro-organisms | 3 weeks | 5 weeks | 7 weeks |
| Geotrichum | 90 | 120 | 166 |
| B. linens | 73 | 107 | 130 |
| A. globiformis | 73 | 100 | 128 |
| Mixture | 78 | 98 | 143 |
| Control | 69 | 97 | 136 |

II—A Dried Fermented Sausage was Prepared According to the Present Invention

II.1 Choice of Micro-organisms

The micro-organisms of which an extract was used in this embodiment were:

Micrococcus

Staphylococcus

Penicillium

II.2 Culture of Micro-organisms

Micrococcus and Staphylococcus were cultured in distinct media composed of lactose, casein peptone, yeast extract, meat peptone, sodium chloride, magnesium sulfate and deionized water.

The pH was held at 6.

Incubation was carried out at 30° C. and lasted 24 hours.

The final concentration of Micrococcus or of Staphylococcus in the broth was $10^9$/ml.

Penicillium was cultured in a medium composed of glucose, calcium chloride, potassium phosphate, potassium nitrate, yeast extract, sodium glutamate, manganese sulfate and deionized water.

The initial pH of this solution was 5.

Incubation was carried out at 21° C. and lasted 3 to 5 days with aerobiosis.

The final concentration of Penicillium in the broth was approximately $10^7$/ml.

II.3 Concentration of the Biomass

This was carried out by centrifuging according to a known process.

II.4 Cell Lysis

This was carried out by osmotic shock by placing a gramme of each culture in 10 ml of a 20% sodium chloride (NaCl) solution. Before the start of lysis, a cell count showed that the concentration of micro-organisms in their respective solutions was approximately:

Micrococcus $10^{10}$/ml
Staphylococcus $10^{10}$/ml
Penicillium $10^8$/ml

II.5 Addition of the Cell Extract from the Collection of Micro-organisms 100 kg of meat were prepared in a cutter.

The usual food processing agents and additives were then added to the blend obtained in this way:

acidifying ferments,
maturation ferments,
sugars
spices as well as the collection of cell extracts according to the present invention.

The latter was prepared by blending:

1 volume of Micrococcus extract solution (33.3%)
1 volume of Staphylococcus extract solution (33.3%)
1 volume of Penicillium extract solution (33.3%)

Table 4 gives the quantitative details of this operation.

TABLE 4

| Micro-organisms | Number of cell equivalents added/g of meat | Quantity of solution introduced into 100 kg of blend |
|---|---|---|
| Micrococcus | $10^6$ | 10 ml |
| Staphylococcus | $10^6$ | 10 ml |
| Penicillium | $10^4$ | 10 ml |
| Mixture | $2.10^6$ | 30 ml |

30 ml of the mixture of extracts from the three microorganisms were added to 100 kg of blend.

All the additives and the blend were mixed so as to obtain a homogeneous product which was then treated by the usual process.

II.6 Ripening of the Product

This type of dried sausage is usually incubated from 3 to 15 days at temperatures varying between 19 and 23° C. It is then dried for 3 to 4 weeks at approximately 13° C.

In the tests carried out, the dried sausages were incubated for 6 days at 21° C. and then dried for a period extending from 2 to 4 weeks.

During these tests, tastings were carried out in order to evaluate the taste and texture of the products.

The results of these tests were as follows:

the usual parameters for following production (water loss etc) showed a normal progress for the ripening process,
the results of the best tests after 2 and 3 weeks corresponded to those of the controls at 3 and 4 weeks respectively, analysis of all the results made it possible to estimate a gain in time of 20 to 30% of the ripening period.

What is claimed is:

1. A process for reducing the duration of the ripening phase during the manufacturing of a fermented food product from a raw material consisting of a milk or a meat, and to improve the organoleptic properties of the fermented food product, said process comprising the steps of:

a) preparing a biomass consisting essentially of a mixture of cells of different species of living ripening microorganisms, b) lysing the cells of said ripening microorganisms to obtain cell extracts, c) blending said cell extracts, and d) adding a volume of said cell extracts to said raw material, wherein the number of microorganism cell equivalents contained in the volume of the cell extracts added to the raw material is from 10 to 1000 times greater than the number of the same microorganism cells present in said raw material.

2. The process of claim 1, wherein said biomass is prepared from a mixture of different ripening microorganisms selected from the group consisting of:

*Corynebacterium glutamicum,*
   *Brevibacterium linens,*
   *Arthrobacter globiformis,*
   genus Propionibacterium,
   genus Micrococcus,
   *Staphylococcus xylosus,*
   *Staphylococcus carnosus,*
   *Hafnia alvei,*
   *Enterococcus faecalis,*
   *Enterococcus faecium,*
   *Debaryomyces hansenii,*
   *Saccharomyces cerevisiae,*
   *Kluyveromyces lactis,*
   *Geotrichum candidum,*
   *Penicillium candidum,*
   *Penicillium chrysogenum,*
   *Penicillium roquefortii,* and
   *Penicillium nalgiovensis.*

3. The process of claim 1, wherein the process produces a soft or uncooked pressed cheese with a flowered rind, and the mixture of ripening microorganisms consists of:

$10^6$ to $5.10^7$ cells of Corynebacterium,
   $10^6$ to $5.10^7$ cells *B. linens,*
   $10^6$ to $5.10^7$ cells of Arthrobacter,
   $10^6$ to $5.10^7$ cells of Micrococcus,
   $10^5$ to $5.10^6$ cells of Debaryomyces,
   $10^5$ to $5.10^6$ cells of Kluyveromyces,
   $10^5$ to $5.10^6$ cells of Geotrichum, and
   $5.10^4$ to $5.10^5$ cells of *P. candidum,* per milliliter of milk.

4. The process of claim 1, wherein the process produces a soft or uncooked pressed cheese with a washed rind, and the mixture of ripening microorganisms consists of:

$10^6$ to $5.10^7$ cells of Corynebacterium,
   $10^6$ to $5.10^7$ cells of *B. linens,*
   $10^6$ to $5.10^7$ cells of Arthrobacter,
   $10^6$ to $5.10^7$ cells of Micrococcus, $10^5$ to $5.10^6$ cells of Debaryomyces, and
$10^5$ to $5.10^6$ cells of Kluyveromyces,
per milliliter of milk.

5. The process of claim 1, wherein the process produces a blue-veined soft cheese, and the mixture of ripening microorganisms consists of:
$10^6$ to $5.10^7$ cells of Corynebacterium,
$10^6$ to $5.10^7$ cells of B. linens,
$10^6$ to $5.10^7$ of Arthrobacter,
$10^6$ to $5.10^7$ cells of Micrococcus.
$10^5$ to $5.10^6$ cells of Debaryomyces,
$10^5$ to $5.10^6$ cells of Kluyveromyces, and
$5.10^4$ to $5.10^5$ cells of P. roquefortii,
per milliliter of milk.

6. The process of claim 1, wherein the process produces a cooked pressed cheese, and the mixture of ripening microorganisms consists of:
$10^6$ to $5.10^7$ cells of Corynebacterium,
$10^6$ to $5.10^7$ of B. linens,
$10^6$ to $5.10^7$ cells of Arthrobacter,
$10^6$ to $5.10^7$ cells of Micrococcus,
$10^6$ to $5.10^7$ cells of Propionibacterium,
$10^5$ to $5.10^6$ cells of Debaryomyces, and
$10^5$ to $5.10^6$ cells of Kluyveromyces,
per milliliter of milk.

7. The process of claim 1, wherein the process produces a cured meat product and the mixture of ripening microorganisms consists of:
$10^6$ to $5.10^7$ cells of Staphylococcus,
$10^6$ to $5.10^7$ cells of Micrococcus,
$10^5$ to $5.10^6$ cells of Debaryomyces,
$10^5$ to $5.10^6$ cells of Kluyveromyces
$5.10^4$ to $5.10^5$ cells of P. chrysogenum, and
$5.10^4$ to $5.10^5$ cells of P. nalgiovensis,
per gram of meat.

8. The process of claim 1, wherein during step d) the volume of said cell extracts is added to only 5 to 50% of the total volume of the raw material to conduct accelerated ripening and thereby prepare a ripened composition, said process further comprising the step of further introducing said ripened composition, after accelerated ripening, into the rest of the raw material as a flavoring.

9. The process of claim 1, wherein in addition to the volume of the cell extract added to the raw material, one or more ripening factors consisting of enzymes, lactic bacteria, and extracts from lactic bacteria cells are added to the raw material.

10. A process for reducing the duration of the ripening phase during the manufacturing of a fermented food product from a raw material consisting of a milk or a meat, by the addition of at least one enzymatic cellular extract utilized in the natural ripening of said raw material, comprising the steps of:

a) preparing a collection of different ripening microorganism cell extracts, comprising the steps of:
preparing a biomass consisting of a mixture of different species of living ripening microorganisms which is fermented to obtain a final biomass comprising $10^9$ UFC/ml for bacteria and $10^7$ UFC/ml for yeasts and moulds,
lysing the cells of said ripening microorganisms of said biomass; wherein the number of ripening microorganism cell equivalents after the step of cell lysis forming said collection is greater than the number of the same microorganism cells present in said raw material; blending the ripening microorganism cell extracts obtained, and b) adding a volume of said cell extracts to said raw material, wherein the number of ripening microorganism cell equivalents in the volume of said cell extracts is 10 to 10,000 times greater than the number of the same microorganism cells present in said raw material.

11. The process of claim 10, wherein cell extracts are obtained from different species of living ripening microorganisms selected from the group consisting of:

*Corynebacterium glutamicum,*

*Brevibacterium linens,*

*Arthrobacter globiformis,* genus Propionibacterium, genus Micrococcus,

*Staphylococcus xylosus,*

*Staphylococcus carnosus,*

*Hafnia alvei,*

*Enterococcus faecalis,*

*Enterococcus faecium,*

*Debaryomyces hansenii,*

*Saccharomyces cerevisiae,*

*Kluyveromyces lactis,*

*Geotrichum candidum,*

*Penicillium candidum,*

*Penicillium chrysogenum,*

*Penicillium roquefortii,* and

*Penicillium nalgiovensis.*

12. A soft or uncooked pressed cheese with a flowered rind, obtained according to the process of claim 3.

13. A soft or uncooked pressed cheese with a washed rind, obtained according to the process of claim 4.

14. A blue-veined soft cheese, obtained according to the process of claim 5.

15. A cooked pressed cheese, obtained according to the process of claim 6.

16. A cured meat product, obtained according to the process of claim 7.

* * * * *